US007605050B2

(12) United States Patent
Bureau et al.

(10) Patent No.: US 7,605,050 B2
(45) Date of Patent: Oct. 20, 2009

(54) METHOD OF BONDING A POLYMER SURFACE TO A CONDUCTING OR SEMICONDUCTING SURFACE AND APPLICATION OF THE SAME

(75) Inventors: Christophe Bureau, Suresnes (FR); Julienne Charlier, Gif-sur-Yvette (FR)

(73) Assignees: Commissariat A L'Energie Atomique, Paris (FR); Alchimer S.A., Massy (FR)

( * ) Notice: Subject to any disclaimer, the term of this patent is extended or adjusted under 35 U.S.C. 154(b) by 325 days.

(21) Appl. No.: 10/525,592

(22) PCT Filed: Aug. 25, 2003

(86) PCT No.: PCT/FR03/50037

§ 371 (c)(1),
(2), (4) Date: Feb. 25, 2005

(87) PCT Pub. No.: WO2004/018548

PCT Pub. Date: Mar. 4, 2004

(65) Prior Publication Data

US 2005/0255631 A1   Nov. 17, 2005

(30) Foreign Application Priority Data

Aug. 26, 2002 (FR) .................................. 02 10565

(51) Int. Cl.
*H01L 21/30* (2006.01)

(52) U.S. Cl. ........................ 438/455; 438/99; 438/780; 438/795; 257/E21.48; 257/E21.519

(58) Field of Classification Search .......... 257/E21.023, 257/E21.03, E21.299, E21.48
See application file for complete search history.

(56) References Cited

U.S. PATENT DOCUMENTS

| 4,421,569 | A | | 12/1983 | Dichter et al. |
| 4,547,270 | A | * | 10/1985 | Naarmann ................... 205/160 |
| 5,284,543 | A | | 2/1994 | Kusano et al. |
| 6,022,597 | A | | 2/2000 | Yan et al. |
| 6,287,687 | B1 | | 9/2001 | Yializis et al. |

(Continued)

FOREIGN PATENT DOCUMENTS

DE   0152573   12/1981

(Continued)

OTHER PUBLICATIONS

Plueddemann et al. "Fundamentals of Adhesion:Adhesion Through Silane Coupling Agents" L.H. Lee (Editor) Plenum Press, New York 9:279-290 (1990).

(Continued)

*Primary Examiner*—Savitri Mulpuri
*Assistant Examiner*—Cheung Lee
(74) *Attorney, Agent, or Firm*—McKenna Long & Aldridge LLP (57) ABSTRACT

The invention relates to a method of bonding a polymer surface to an electrically conductive or semiconductive surface, which method is characterized in that it comprises:
  a) the electrografting of an organic film onto the conductive or semiconductive surface; and then
  b) an operation of bonding the polymer surface to the conductive or semiconductive surface thus grafted.

It also relates to applications of this method and to structures obtained by its implementation.

20 Claims, 4 Drawing Sheets

Time (h)

U.S. PATENT DOCUMENTS

| | | |
|---|---|---|
| 6,306,975 B1 | 10/2001 | Zhao et al. |
| 6,335,571 B1 | 1/2002 | Capote et al. |
| 6,566,170 B1 | 5/2003 | Marion et al. |
| 2001/0005738 A1 | 6/2001 | Bruchmann et al. |

FOREIGN PATENT DOCUMENTS

| | | |
|---|---|---|
| EP | 0701802 | 3/1996 |
| EP | 0761320 | 3/1997 |
| EP | 1110946 | 6/2001 |
| FR | 2780200 | 12/1999 |
| FR | 2781232 | 1/2000 |
| WO | WO 98/32474 | 7/1998 |
| WO | WO 98/49206 | 11/1998 |
| WO | WO 99/16907 | 4/1999 |
| WO | WO 00/51732 | 9/2000 |
| WO | WO 02/098926 | 12/2002 |

OTHER PUBLICATIONS

Sintzel et al. 'Synthesis and characterization of self-catalyzed poly(ortho ester) *Biomaterials* 19:791-800 (1998).

Lou et al. "Electrografting of Preformed Aliphatic Polyesters onto Metallic Surfaces" *Langmuir, ACS*, Washington D.C. 18:2785-2788 (2002).

* cited by examiner

METHOD OF BONDING A POLYMER SURFACE TO A CONDUCTING OR SEMICONDUCTING SURFACE AND APPLICATION OF THE SAME

This application is a national phase application of PCT Application No. PCT/FR2003/050037 Aug. 25, 2003 which claims the benefit of French Patent Application No. 02/10565, filed Aug. 26, 2002, which are both hereby incorporated by reference.

TECHNICAL FIELD

The present invention relates to a method for bonding a polymer surface to a conductive or semiconductive surface, to applications of this method and to structures obtained by implementing it.

The term "polymer surface" is understood to mean a surface formed from a polymer and corresponding to all or part of the surface of an object that may be either exclusively made from this polymer or formed from one or more other materials, at least one part of the surface of which consists of said polymer. In particular, the object may be an object that includes an electrically conductive or semiconductive region, the surface of which consists of a polymer.

The expression "conductive or semiconductive surface" is understood to mean a surface consisting of an electrically conductive or semiconductive material and corresponding completely or partly to the surface of an object that may be either exclusively formed from this conductive or semiconductive material or is formed from one or more other materials, at least one part of the surface of which consists of said conductive or semiconductive material.

The method according to the invention is of course applicable in all fields in which it is necessary to bond a polymer, and in particular a thermoplastic polymer, to an electrically conductive or semiconductive surface.

For example, mention may be made of the field of composites, such as those used in the aerospace, aeronautical and automotive industries in which the problems of corrosion-protection paints and coatings on parts flaking off for example can be remedied by the method of the invention. Mention may also be made of the biomedical field in which the method according to the invention may be useful, for example, for coating medical or implantable surgical instruments such as vascular endoprostheses (or stents), aneurysm guides, catheter guides, pacemakers, hip prostheses, cochlear implant electrodes, dental implants or even electrophysiology electrodes, with biocompatible materials suitable for ensuring controlled release of biologically active substances.

However, the method according to the invention may also be applicable in fields where it is necessary for there to be strong mechanical attachment between two objects having electrically conductive or semiconductive regions, and especially when the attachment has to be effected in these regions. In particular, the method according to the invention may be of great use in the case in which it is desirable for the attachment to be carried out at temperatures below those needed for effecting direct thermal bonding, whether for technical reasons (such as the heat sensitivity of the materials) or economic reasons, or else when the attachment is intended to be carried out via a flexible link. Such constraints are very commonly present in the assembly of sensitive components of microsystems, such as microsensors, and in particular in the assembly carried out using the PFC (polymer flip chip) technology.

PRIOR ART

The bonding of an organic material, and especially a polymer, to an electrically conductive or semiconductive material poses a number of difficulties.

This is because organic materials exhibit localized surface states: in chemical terms, they are said to possess functional groups. In this context, it is "simple" to carry out chemistry on a polymer surface insofar as this involves making the functional groups react together and therefore draws on experience acquired in organic chemistry. However, the surface of conductive or semiconductive materials is formed from delocalized electronic states (excluding surface defects): in chemical terms, even the notion of functional groups disappears and experience acquired in organic chemistry can no longer be applied to the surface chemistry of conductive or semiconductive materials.

Thus, included among the proposed solutions are firstly those consisting in providing the surface of the conductive or semiconductive material with organic functional groups so that this material can be bonded to the organic material by a chemical reaction.

This may for example be achieved by forming, on this surface, layers of oxides or hydroxides on which it is then possible to make complementary functional groups react, such as isocyanate groups (EP-A-1 110 946 [1]), siloxanes (WO-A-00/51732 [2]) or acid chlorides (FR-A-2 781 232 [3]), or using bifunctional coupling agents or chemical adhesion promoters such as γ-aminopropyltrimethoxysilane (E. P. Plueddmann in "Fundamentals of Adhesion", L. H. Lee (Editor), page 269, Plenum Press, New York, 1990 [4]).

The surface of the conductive or semiconductive material may also be pretreated so as to create functional groups thereon that have a higher reactivity than that of the above-mentioned oxides and hydroxides, with a view to obtaining a more rapid reaction with the polymer material. These may especially be unstable functional groups, formed in a transient manner, such as radicals generated by an abrupt oxidation of said surface, either by chemical means or by irradiation.

Thus, for example, U.S. Pat. No. 6,022,597 [5] proposes the exposure of the surface to a reactant having nitrogen-generating groups (for example azide groups) and bombardment of this surface by particles (ions, electrons, protons, etc.) in order to convert the nitrogen-generating groups into nitrene groups capable of subsequently reacting with a large number of organic functional groups.

U.S. Pat. No. 6,287,687 [6] proposes the functionalization of a surface by subjecting it to a plasma treatment in which the plasma gas contains a monomer capable of polymerizing or copolymerizing with other compounds that can polymerize under irradiation.

U.S. Pat. No. 4,421,569 [7] proposes to functionalize a surface by applying an aqueous suspension, comprising a polymer precursor monomer, a prepolymer, metal salts and a catalyst, to said surface, the metal salts being used to oxidize said surface so as to create thereon radicals that can initiate the monomer and prepolymer polymerization reactions.

The surface of the conductive or semiconductive material may also be functionalized by means of radicals that are made to react by irradiation with heavy ions (U.S. Pat. No. 6,306, 975 [8]), by thermal means (WO-A-98/49206 [9]) or even photochemically as disclosed in WO-A-99/16907 [10].

All these methods rely on the intention of creating the strongest possible chemical bonds, and especially covalent bonds, at the organic material/conductive or semiconductive material interface. In general, these methods have the two disadvantages of using chemical reactants and/or activation operations that are complex and expensive, and of requiring the optimization of operating protocols that are often lengthy, since the surface chemical reactions occur at substantially lower rates than equivalent rates in solution.

Moreover, methods using polymerization reactions initiated from the surface of a material make it possible, at the end of reaction, to remove neither the initiators nor certain monomers that have not reacted. Now, many of these compounds are toxic, because they are reactive, which makes this type of method unsuitable for use in the biomedical field.

In addition, insofar as the material that has to be attached to the functional groups provided on the surface of the conductive or semiconductive material itself acts as a chemical reactant, it is often necessary to chemically modify said material in order to attach to it groups that are complementary to those present on said surface. This again adds, to the operating protocols, at least one additional step and substantially increases its cost.

Another type of solution consists not in creating chemical bonds at the organic material/conductive or semiconductive material interface but in forming, on the conductive or semiconductive surface, a layer of the organic material, which is insoluble in most known solvents, by reckoning on the fact that physical forces present are sufficient to ensure adhesion of this organic material to said surface, as long as the interface is stable.

This can be achieved in particular by crosslinking the organic material during or after its deposition on the surface of the conductive or semiconductive material, it being possible for this deposition to be carried out by spin coating or by dip coating.

This approach is used in the biomedical field, for example for coating stents with polymeric reservoirs of active molecules, which are subsequently stabilized by crosslinking of fibrin (EP-A-0 701 802 [11]) or of a chemical crosslinking agent (WO-A-98/32474 [12]), and in the field of Microsystems for producing polymer bumps used for the mechanical assembly of microstructures via the PFC technology, or else used for the encapsulation of Microsystems (U.S. Pat. No. 6,335,571 [13]).

However, this approach has the major disadvantage of resulting, owing to the absence of bonds at the interface between the organic material and the conductive or semiconductive material, in joints that are mechanically not very strong, especially when they are subjected to stresses of the vibration, torsion or similar type, in particular at the organic material/conductive or semiconductive material interface.

Even though the PFC technology has developed considerably, many assemblies are still produced using the "indium bump or flip-chip connection" technique that uses fusible metal bumps based on lead and indium (FR-A-2 780 200 [14]). In general, this type of assembly requires high bonding temperatures and also uses mechanically weak joints because they can break when stressed.

Finally, it should be emphasized that, in the case of the assembly of microstructures, none of the abovementioned methods is suitable for use in restricted conductive or semiconductive regions. This is because, whether attachment is via chemical surface reactions, crosslinked polymers or fusible bumps, it is necessary in all cases, during at least one step, to carry out a conformal deposition process, in which the material deposited conforms to the topology of the conductive or semiconductive regions, such as the use of dispensing robots capable of pipetting a polymer solution at the desired point or else laser ablation operations capable of removing a layer of polymer that has been uniformly deposited on the surface.

It follows from the foregoing that there exists a real need for a method that allows a polymer material to be firmly attached to a conductive or semiconductive surface while being free of the drawbacks of the various methods proposed hitherto for carrying out such an attachment.

SUMMARY OF THE INVENTION

The present invention makes it possible to meet this requirement by providing a method of bonding a polymer surface to a conductive or semiconductive surface, which method is characterized in that it comprises:

a) the electrografting of an organic film onto the conductive or semiconductive surface, and then b) an operation of bonding the polymer surface to the conductive or semiconductive surface thus grafted.

Within the context of the present invention, the expression "electrografting of an organic film onto a conductive or semiconductive surface" is understood to mean an operation that consists in bringing this surface into contact with at least one precursor of this organic film and in causing, by applying one or more electrical potential scans to the conductive or semiconductive surface, this precursor to be attached via covalent bonds to said surface and, thereby, forming an organic film.

The attachment of the precursor to the conductive or semiconductive surface may, when said precursor lends itself thereto, be accompanied by precursor polymerization reactions that have the effect in particular of increasing the thickness of said organic film.

Moreover, the expression "operation of bonding a polymer surface to a conductive or semiconductive surface" is understood to mean an operation consisting in bonding these two surfaces so that they form an indivisible mass.

As will be described later, this operation may be carried out equally well cold, for example by means of a substance capable of dissolving or swelling the polymer surface and the organic film electrografted onto the conductive or semiconductive surface—this type of operation being referred to hereafter by the term "cold bonding"—as hot, i.e. by supplying thermal energy suitable for causing the contacting surfaces to melt—this type of operation being called hereafter "hotmelt bonding", or even by combining cold bonding with hotmelt bonding.

Before carrying out this bonding operation, the method according to the invention includes subjecting the conductive or semiconductive surface to a pretreatment, which consists of the electrografting of an organic film, the film thus electrografted having the two advantages of being highly adherent to the surface that has given rise to it and of being organic, like the polymer surface that has to be bonded to the conductive or semiconductive surface.

Thus, although the thickness of this film is generally small to very small (i.e. less than 1 µm or even less than 500 nm), it turns out, surprisingly, that said film is capable of acting as a bonding "seed" and of making it possible to form a bonded joint between the conductive or semiconductive surface and a polymer surface by simple contact between the latter and by applying bonding conditions.

Thus, although it is impossible ordinarily to bond a polymer material directly to a conductive or semiconductive material, owing to their difference in nature and, thereby, difference in melting points, difference in bonding stresses, etc., such bonding is made possible by the method according to the invention thanks to a prior modification of the surface of the conductive or semiconductive material, this modification consisting in the electrografting of an organic film.

According to the invention, the organic film may be electrografted onto the conductive or semiconductive surface by electroinitiated grafting or electrocontrolled deposition, in which case the organic film is a polymer film.

In the case of electroinitiated grafting, it is only the attachment of the precursor to the conductive or semiconductive surface that results from an electrochemical reaction, that is to say a reaction caused by the application of an electrical potential, the precursor polymerization reactions, when they exist, being purely chemical, autonomous and independent of any electrical potential.

However, in the case of electrocontrolled deposition, the precursor polymerization reactions are electrochemical, like the attachment of this precursor to the conductive or semiconductive surface, and therefore remain bonded by maintaining an electrical potential. An example of electrocontrolled deposition is electropolymerization that uses, as precursors, conductive monomers such as pyrrole, aniline, thiophene or EDOT (ethylene dioxythiophene).

Within the context of the present invention, it is preferred that the electrografting of the polymer organic film be electroinitiated grafting. This is because the inventors have found that this type of electrografting has the following advantages: (i) it results in the formation of covalent bonds between the polymer organic film and the conductive or semiconductive surface; (ii) it allows polymer to be deposited extremely locally on chosen areas having a given work function; (iii) it permits very precise control over the thickness uniformity, even on highly uneven ohmic-drop topographies (rough surfaces, worked surfaces having high aspect ratio features, etc.).

According to a first preferred way of implementing the method according to the invention, when the organic film is a polymer film, the precursor is a monomer or a precursor prepolymer of this film, or else a mixture of the two.

In this preferred method of implementation, the electrografting of the polymer film comprises, apart from the attachment of the precursor of this film to the conductive or semiconductive surface, polymerization reactions within the chain of this precursor. These polymerization reactions take place from the monomers and/or prepolymers that are attached to said surface under the effect of the electrical potential, and results in growth or "sprouting" of polymeric chains from this surface. Each polymeric chain thus formed is therefore covalently bonded to the conductive or semiconductive surface.

When the grafting is electroinitiated, the precursor monomers and prepolymers of the organic film may be chosen, in the first place, from organic compounds having vinyl groups, in which case the electroinitiation consists of an electroreduction (or an electrooxidation) of these monomers and/or prepolymers. It is these thus electroreduced (or electrooxidized) monomers and/or prepolymers that initiate the polymerization reactions which, in this case, are anionic (or cationic).

The monomer compound or prepolymer that can be used for this purpose is partly or completely functionalized by vinyl groups, and especially vinyl monomers such as acrylonitrile, methacrylonitrile, acrylates and methacrylates (methyl acrylate and methyl methacrylate, ethyl acrylate and ethyl methacrylate, propyl acrylate and propyl methacrylate, butyl acrylate and butyl methacrylate, hydroxyethyl acrylate and hydroxyethyl methacrylates, glycidyl acrylate and glycidyl methacrylate, polyethylene glycol dimethacrylate, polydimethylsiloxane acrylate and polydimethylsiloxane methacrylate), acrylamides and methacrylamides, cyanoacrylates, acrylic acid and methacrylic acid, styrene, vinyl halides, N-vinylpyrrolidone, 2-vinylpyridine, 4-vinylpyridine and vinyl-terminated telechelic compounds.

When the grafting is electroinitiated, the monomers and prepolymers may also be chosen from organic compounds containing cyclic groups that can be cleaved by nucleophilic or electrophilic attack, in which case the electrografting takes place according to the same principle as that above apart from the fact that the growth of the polymeric chains results from opening the monomer or prepolymer rings.

In this case, any monomer or prepolymer compound partly or completely functionalized by cyclic groups cleavable by nucleophilic or electrophilic attack can be used, especially epoxides, c-caproplactone, butyrolactone and telechelic compounds having cleavable cyclic end groups.

According to another preferred way of implementing the method according to the invention, the precursor of the organic film is chosen from diazonium salts, especially aryl diazonium salts, sulfonium salts, phosphonium salts, iodonium salts and mixtures thereof, these salts preferably being functionalized by macromolecular fragments of the polyethylene and other polyolefin or polyethylene oxide type, and more generally any thermoplastic oligomer or polymer.

These salts have in common the fact that their reduction results in radicals that are adsorbed on the conductive or semiconductive surface and cause no growth of polymeric chains. This is therefore one particular case of electroinitiated grafting, in which the latter is reduced to its simplest expression and allows films of very small thickness, close to a molecular monolayer, to be produced.

According to the invention, it is also possible to carry out the electrografting of the organic film by using several precursors chosen from the various types of precursors mentioned above.

Be that as it may, the electrografting of the organic film is preferably obtained by immersing the conductive or semiconductive surface in a solution containing the precursor or precursors of said organic film and by connecting this surface to a potentiostat so as to apply one or more electrical potential scans to it, these scans possibly being continuous or discontinuous, sinusoidal or pulsed scans.

Once the organic film has been electrografted, the operation of bonding the polymer surface to the conductive or semiconductive surface may be carried out, this preferably consisting of a hotmelt operation or a cold bonding operation or else a hotmelt/cold bonding combination.

The hotmelt operation may be carried out by applying one surface to the other and supplying, to the resulting assembly, optionally in a press or clamped, thermal energy, for example by heating or by applying electromagnetic radiation, sufficient to melt the two contacting surfaces and thereby causing them to interpenetrate.

Sufficient thermal energy corresponds, for example, to a temperature above that one which, of the glass transition temperatures of the polymer surface that has to be bonded and of the organic film electrografted onto the conductive or semiconductive surface, is the higher.

As regards the bonding, it is preferred to use, as bonding agent, a substance, for example a solvent, that is capable of both dissolving or swelling the polymer surface that has to be bonded and the organic film electrografted onto the conductive or semiconductive surface.

This bonding may be accomplished in various ways depending on its end use. Thus, for example, if the purpose of the bonding is to coat a polymer onto a part made of a conductive or semiconductive material and able to withstand being subjected to an immersion operation—which is especially the case for a stent or a pacemaker package—then this bonding may be carried out by immersing this part in a solution containing the polymer to be bonded and the bonding agent and then by drying said solution, in which case the formation of the polymer film and its bonding to the conductive or semiconductive surface take place simultaneously. When such an immersion operation is not possible, if only because the polymer surface is that of an object already formed, then the bonding may be carried out by coating the polymer surface and the conductive or semiconductive surface with a bonding agent, then applying one surface to the other and drying the resulting assembly, optionally under reduced pressure and/or in a press or clamped.

The polymer constituting the polymer surface that has to be bonded may be purely organic or hybrid (i.e. organic/inorganic) and may be a thermoset or a thermoplastic, as long as, in the latter case, it can be dissolved or swollen by a substance that is also a solvent or a swelling agent for the material forming the electrografted organic film.

Moreover, when the electrografted organic film is itself a polymer film, the polymer constituting the polymer surface that has to be bonded may not only be the same as the polymer constituting this organic film but also one that differs therefrom.

Appropriate polymers are especially polyethylenes, polypropylenes, polystyrenes, polyacrylonitriles, polysiloxanes, polyesters, such as polylactic acid and polyglycolic acid, polyorthoesters, polycaprolactones, polybutyrolactones, polyacrylics, polymethacrylics, polyacrylamides, epoxide resins, ABS resins, polyvinylchloride, polycarbonate, polytetrafluoro-ethylene, perfluorinated polyethers, phenoplast resins, polyurethanes, epoxy resins, copolymers thereof and blends thereof.

Within the context of the present invention, it is preferred to use hotmelt polymers—or thermoplastic polymers—even though thermosetting polymers may also constitute useful candidates.

As regards the material that can form the conductive or semiconductive surface, this may be any known material that has the properties of an electrical conductor or semiconductor, such as metals (noble or otherwise) and metal alloys, silicon, germanium or even gallium arsenide.

The method according to the invention has many advantages.

Specifically, it affords, in the first place, the possibility of bonding a polymer material to a conductive or semiconductive material, i.e. a material having a very high melting point for which there is generally no temperature range permitting thermal bonding to a polymer, polymers for the most part decomposing at the melting point of conductive or semiconductive materials.

It also affords the possibility of bonding a first conductive or semiconductive material, coated with an organic film, whether electrografted or otherwise, to a second conductive or semiconductive material that is not coated with an organic film. In this case, it is sufficient to pretreat the surface of the second material so as to coat it with an electrografted organic film and then to carry out an operation to bond the two conductive or semiconductive materials together, as described above. As a variant, the bonding operation may be carried out after having not only electrografted an organic film onto the surface of the second conductive or semiconductive material, but also having inserted a polymer film between the organic films forming the surfaces of the two conductive or semiconductive materials. Thus, when the organic film forming the surface of the first conductive or semiconductive material is itself an electrografted film, two bonded joints according to the invention are produced.

In all cases, it turns out that the best results are obtained when the organic film forming the surface of the first conductive or semiconductive material is an electrografted film, the electrografting making it possible to have stronger interfaces than with the other methods currently available for forming an organic film on a surface.

On the basis of the foregoing, the method according to the invention also allows two conductive or semiconductive materials, neither of which is coated with a polymer film, to be bonded together.

In particular, it allows a bonded joint to be produced between two materials having very high melting points—this is particularly the case for metals, silicon and germanium—without ever having to carry out a step involving such a high melting point. This advantage may prove to be very useful when two conductive or semiconductive regions belonging to separate and complex objects, certain regions of which are heat-sensitive, have to be bonded together. It also contributes to substantial energy consumption savings being made, since it replaces a bonding operation that has to be carried out at very high temperatures with an electrografting operation, which is carried out at room temperature, and an operation of thermally bonding the two organic materials, which requires much lower temperatures than the thermal bonding of inorganic materials, or even a cold bonding operation.

As mentioned above, the organic film electrografted onto the conductive or semiconductive surface may or may not be formed from the same polymer as that forming the polymer surface to which said conductive or semiconductive surface is intended to be bonded.

In the case when the polymers are the same, the method according to the invention allows thick to very thick films to be obtained very easily on a conductive or semiconductive material, particularly macroscopic films (i.e. those with a thickness of greater than 500 µm) that are highly adherent, whereas electrografting alone results in the formation of films having a thickness not exceeding the order of one micron. The films thus obtained may, for example, be plastic films produced by extrusion or any other means, which are then bonded to the conductive or semiconductive material onto which a film of the same nature has been electrografted beforehand.

If the polymers are different, the method according to the invention makes it possible to obtain, on a conductive or semiconductive surface, a polymer film which normally would be unable to be electrografted onto this surface or could only be so with serious difficulties. This is because electrografting is a complex process that does not permit all the polymers to be grafted with the same effectiveness onto all conductive or semiconductive surfaces. In addition, certain polymers, such as those obtained by polycondensation of monomers, lend themselves poorly to electrografting. The method according to the invention offers a solution to this problem since all that is required is to electrograft, onto the conductive or semiconductive surface, a polymer film which is both compatible with the polymer with which it was initially sought to coat this surface and is easy to electrograft onto said surface.

In all cases, the method according to the invention makes it possible to create very strong adhesive links between the bonded surfaces.

In addition to all the abovementioned advantages, the method according to the invention also has other advantages, in particular the following:

it does not require any prior modification, and especially no
    prior functionalization, of the polymer surface that has to be bonded, thereby, in the case of a biocompatible polymer, eliminating the risk of it losing its biocompatibility properties, it does not use any chemical compound other than the precursor of the electrografted organic film and, when appropriate, the bonding agent, which considerably limits the risks of toxicity in the case of biomedical applications, and it is simple to implement and requires neither complex and expensive operating protocol nor complex and expensive equipment.

Consequently, the method can be used in very many applications, among which mention may be made of the manufacture and renovation of composites intended for the aerospace, aeronautical, automotive, biomedical, electronic and microsystems industries, the manufacture of implantable surgical and medical instruments, the assembly of sensitive components of microsystems and the packaging of Microsystems.

The subject of the invention is also a structure comprising a conductive or semiconductive surface bonded to a polymer surface via an organic film with a thickness of less than 1 µm.

Yet another subject of the invention is a structure comprising a conductive or semiconductive surface bonded to a polymer surface via an organic film, in which said organic film is bonded to said conductive or semiconductive surface via covalent bonds.

Such structures are, for example, implantable surgical or medical devices such as stents, aneurysm guides, catheter guides, pacemakers, hip prostheses, cochlear implant electrodes, dental implants or even electrophysiology electrodes, or else microsystems such as microsensors.

Apart from the above provisions, the invention also includes other provisions that will become apparent from the rest of the description that follows, which relates to illustrative examples of bonded joints formed by the method according to the invention and examples of their performance, this description being given purely by way of illustration but implying no limitation, with reference to the appended drawings.

EXAMPLE 1

Bonding by Hotmelt Bonding of a Gold Wire to a Gold Slide

Butylmethacrylate (BuMA) was dissolved, in a three-electrode electrochemical cell, in a solution comprising $5 \times 10^{-2}$ mol/l of tetraethylammonium perchlorate in dimethylformamide (DMF), in an amount of 5 mol of butylmethacrylate per liter of solution.

Next, a glass slide coated with an evaporated gold layer was immersed in this solution. This slide was connected to the working terminal of a potentiostat and acted as working electrode. The other two electrodes of the device were a large platinum electrode, serving as counterelectrode, and a silver wire used as reference electrode.

Next, ten potential scans were applied to the gold slide under voltammetric conditions, between −0.1 and −2.6 V/($Ag^+$/Ag), at a rate of 100 mV/s. The slide was rinsed with DMF and then with acetone, and finally dried in a stream of argon. A film of polybutyl-methacrylate (poly-BuMA) approximately 50 nm in thickness was thus obtained.

The same treatment was applied to a gold wire 25 µm in diameter and 3 cm in length. IRRAS spectroscopy was used to check that the wire was actually coated with poly-BuMA, but its precise thickness was difficult to determine.

The wire was then deposited on the slide and held in place by means of a Mohr clamp. The assembly was placed overnight in an oven heated to 200° C., this representing a temperature well below the melting point of gold (1064.43° C.).

After cooling and removal of the Mohr clamp, it was found that the gold slide could be picked up by merely taking hold of the wire, proving that the bond established between this slide and the wire was strong.

Figure 1:
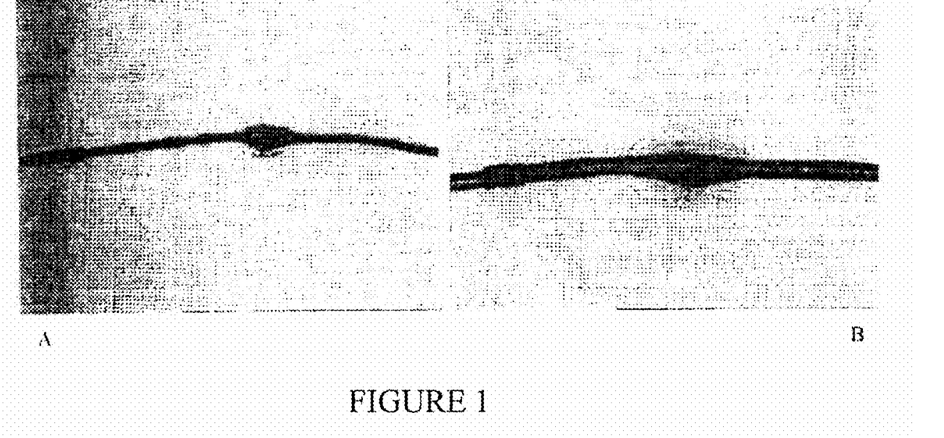
FIG. 1 corresponds to two photographs, respectively A and B, taken in an optical microscope at two different magnifications (50× and 100×), showing the contact region between a gold wire and a gold slide that are bonded together by hotmelt bonding according to the invention.

FIG. 1 shows two photographs taken under the optical microscope at regions where the hotmelt bonding between the wire and the slide are apparent, photograph A corresponding to a magnification of 50× and photograph B corresponding to a magnification of 100×.

This figure shows that the number of anchoring points is, however, generally quite small, which is probably due to the fact that the wire is not straight, and is unable to be in contact with the slide over its entire length during the hotmelt bonding.

EXAMPLE 2

Hotmelt Bonding of a Polystyrene Film to a Stainless Steel Strip

A 316L stainless steel strip 10 cm in length and 1 cm in width was dipped into a solution containing 3.125 mol/l of methyl methacrylate (MMA), $10^{-2}$ mol/l of 4-nitrophenyl-diazonium tetrafluoroborate and $2.5 \times 10^{-2}$ mol/l of sodium nitrate in the DMF. This strip served as working electrode in a three-electrode arrangement similar to that used in Example 1.

This strip was subjected to a series of fifty potential scans under voltammetric conditions, between −0.1 and −3.0 V/($Ag^+$/Ag), at a rate of 100 mV/s. The strip was then rinsed with DMF, then with acetone and finally dried in a stream of nitrogen. A film of polymethyl-methacrylate (poly-MMA) approximately 300 nm in thickness was obtained.

Next, a polystyrene film 10 cm in length, 1 cm in width and 75 μm in thickness was applied to the entire strip thus treated. The film was pressed onto the strip at one of its ends using a Mohr clamp, so that the pressed region measured about 2 cm in length by 1 cm in width. The assembly was placed in an oven at 200° C. for two days.

Figure 2:
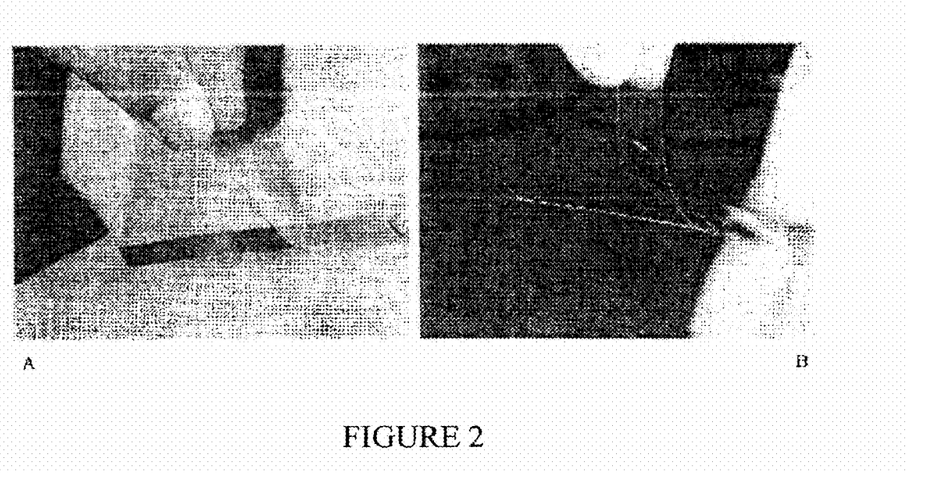
FIG. 2 corresponds to two photographs, respectively A and B, showing the bonding region between a polystyrene film and a stainless steel strip that are bonded together by hotmelt bonding according to the invention.

After cooling and removal of the Mohr clamp, the polystyrene film was found to be bonded to the stainless steel strip. In particular, it was found to be possible to lift up the strip by merely taking hold of the assembly via the unbonded end of the polystyrene film, as illustrated by photographs A and B in FIG. 2.

EXAMPLE 3

Hotmelt Bonding of a Polystyrene Film to a Stainless Steel Strip

Using the same protocol as that described in Example 2, polystyrene films 75 μm in thickness were bonded to 316L stainless steel strips pretreated by electrografted films of polymethacrylonitrile (PMAN), polyhydroxyethyl methacrylate (PHEMA) and poly-ε-capro-lactone (PCL) respectively, having thicknesses of between 300 and 500 nm.

Results similar to those reported in Example 2 were observed, namely the fact that the bond between the polystyrene films and the strips was sufficiently strong for them to be able to be lifted up by taking hold of the assemblies via the unbonded end of these films.

EXAMPLE 4

Hotmelt Bonding of Two 316L Stainless Steel Strips

Two 316L stainless steel strips 10 cm in length and 1 cm in width were pretreated, in an identical manner, with an electrografted poly-MMA film approximately 300 nm in thickness using a protocol similar to that described in Example 2.

One strip was superposed on the other and, inserted between them, at one of their ends, was a polystyrene film 2 cm in length, 1 cm in width and 75 μm in thickness. The sandwich thus obtained was clamped, using a G-clamp, over an area measuring about 2 cm in length by 1 cm in width.

The assembly was placed in an oven at 200° C. for two days.

Figure 3:
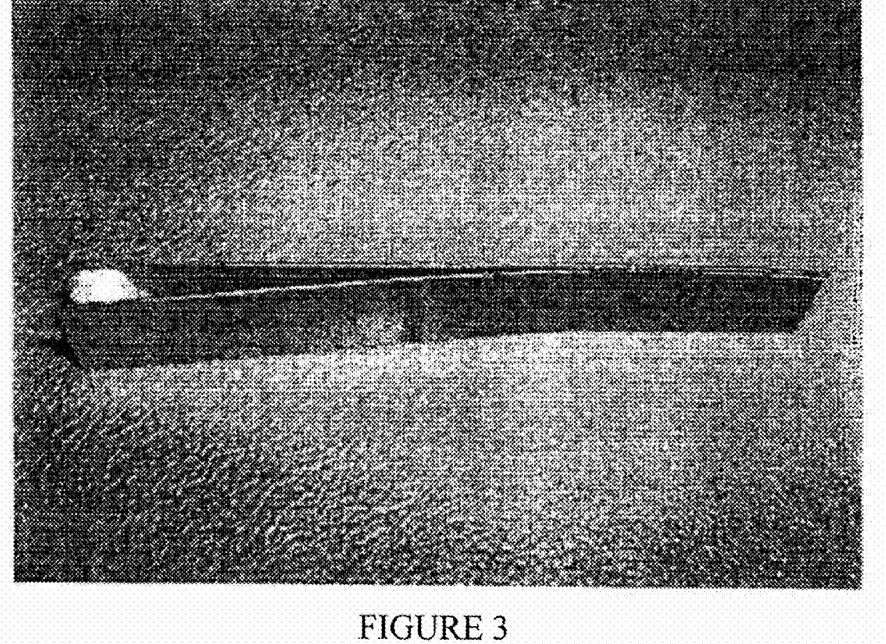
FIG. 3 is a photograph illustrating the capability of a hotmelt bonded joint produced according to the invention between two stainless steel strips to withstand an attempt to separate these two strips.

After cooling and removal of the G-clamp, it was observed that the two strips were bonded together. The assembly was placed on the edge and the two unbonded ends of the two strips were separated. A spacer was inserted into the space thus made so as to maintain a separation of 1 cm between the unbonded ends of the strips. FIG. 3 shows that the bonded joint did not fail when stressed in this way.

EXAMPLE 5

Cold Bonding of a Polylactic Acid Film to a 316L Stainless Steel Strip

This example illustrates the benefit provided by cold bonding, carried out using the method according to the invention, between a polylactic acid (PLA) film and a 316L stainless steel surface, on the stability of the interface resulting from such bonding.

This benefit was demonstrated by cold bonding two PLA films, one filled with 20% (w/w) pentoxifylline and the other with 40% (w/w) pentoxifylline, to two 316L stainless steel strips pretreated with an electrografted poly-BuMA film, and by comparing the amount of pentoxifylline released by these films, when the strips were maintained for several days in an aqueous solution, with the amount released by a film of PLA filled with 20% (w/w) pentoxifylline, said film having been deposited on a 316L stainless steel strip that had not been pretreated with an electrografted poly-BuMA film.

To do this, a poly-BuMA film approximately 300 nm in thickness was electrografted onto two 316L stainless steel strips 10 cm in length and 1 cm in width, using the same operating protocol as that described in Example 2.

Moreover, a 10% (w/w) solution of polylactic acid [poly (2-hydroxypropionic acid)], with a weight-average molecular weight of 250,000 g/mol, in chloroform was prepared, chloroform being a solvent for PLA. Starting from this solution, two PLA solutions containing 20% and 40% (w/w) pentoxifylline respectively were prepared. These solutions were stirred for two hours and then a PLA film filled with 20 or 40% (w/w) pentoxifylline was deposited on the stainless steel strips coated with poly-BuMA electrografted by dipping these strips into said solutions. The films thus obtained had a thickness of about 3 μm. The 316L stainless steel strip not pretreated with an electrografted poly-BuMA film was also immersed in the 20% (w/w) pentoxifylline solution.

The strips thus prepared were put in an oven at 40° C. for 4 h. Each of them was then introduced into a closed container, containing aqueous PBS buffer solution at 7.4 pH and placed in an incubator at 37° C. with stirring.

Regular samples were taken from the aqueous solution in which each strip was immersed, said solution being replenished at the same time. Each sample was extracted with chloroform and the pentoxyfylline concentration present in the solution was determined by UV-visible spectroscopy in transmission at 278 nm.

Figure 4:
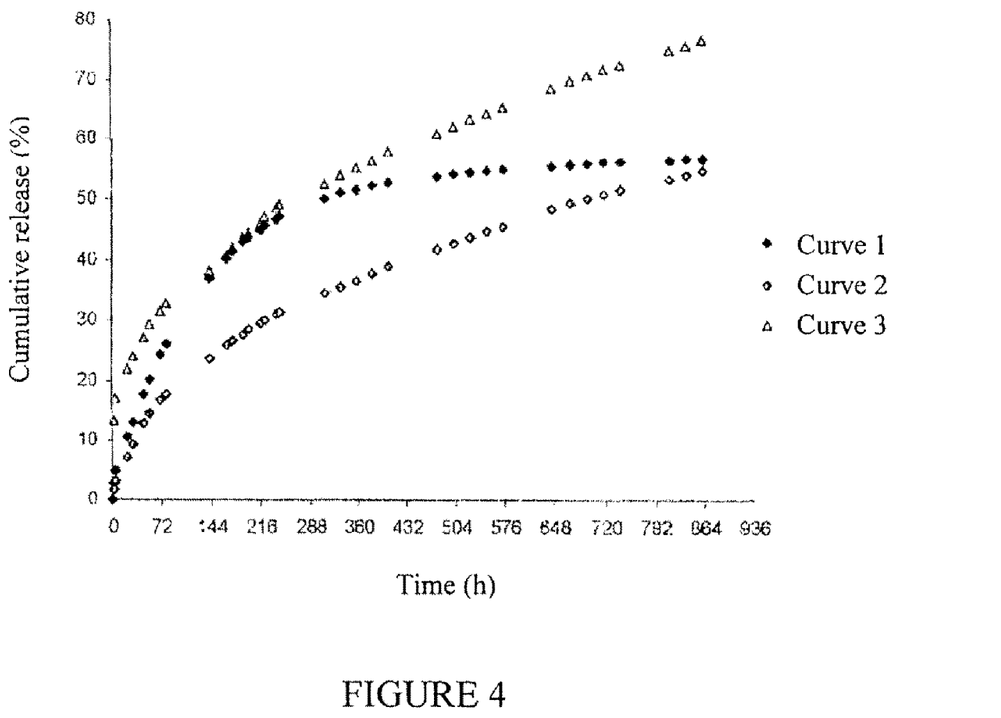
FIG. 4 shows the pentoxifylline release profiles obtained for two polylactic acid (PLA) films filled with 20% and 40% (w/w) pentoxifylline respectively and bonded, by bonding according to the invention, to stainless steel strips (curves 2 and 3), and the profile obtained for a PLA film filled with 20% (w/w) pentoxifylline and having been deposited on a stainless steel strip (curve 1).

The results obtained are illustrated in FIG. 4, in which the cumulative concentration (in percent) of pentoxifylline released is plotted on the Y-axis and time (in hours) is plotted on the X-axis, curves 1, 2 and 3 corresponding, respectively:

Curve 1, to the PLA film filled with 20% (w/w) pentoxifylline deposited on the untreated stainless steel strip;

Curve 2, to the PLA film filled with 20% (w/w) pentoxifylline bonded to one of the two stainless steel strips pretreated with an electogrative poly-BuMA film; and Curve 3, to the PLA film filled with 40% (w/w) pentoxifylline bonded to one of the two stainless steel strips pretreated with an electrografted poly-BuMA film.

This figure shows that release of pentoxifylline by the PLA film deposited on the unpretreated stainless steel strip is rapid, since a plateau is reached after 8 to 10 days of incubation, indicating this release has stopped. Inspection of that strip showed that the PLA film had delaminated and no longer adhered to the stainless steel surface.

Curves 2 and 3 show that, after a very rapid "burst" of release due to diffusion of the excess pentoxifylline, the release profiles for pentoxifylline released by the PLA films bonded to the stainless steel strips pretreated with an electrografted poly-BuMA film become linear and ensure steady delivery of this compound. Inspection of these strips showed, moreover, no local deterioration (for example flaking) of the PLA films. This means that the PLA/poly-BuMA interface was strong enough to withstand the release medium and suggests that release would be only due to progressive hydrolysis of the PLA at its surface in contact with the aqueous solution.

Moreover, this example demonstrates that the method according to the invention makes it possible for a biocompatible polymer film such as PLA to be firmly attached to a metal surface without having to modify this polymer beforehand—thereby eliminating any risk of impairing its biocompatibility—and, in addition, of including in this film a fragile molecule, such as pentoxyfylline, which is very sensitive to heat and to temperature.

It follows that the method according to the invention can be very useful for coating surgical or medical instruments, and especially implants, with biocompatible materials, and in particular with materials intended for the controlled release of biologically active substances.

EXAMPLE 6

Cold Bonding of a Polyorthoester (POE) Film to a 316L Stainless Steel Strip

This example also illustrates the benefit provided by cold bonding, carried out by the method according to the invention, between a polyorthoester (POE) film and a 316L stainless steel surface, on the stability of the interface resulting from such bonding.

This benefit was demonstrated by cold bonding a POE film to a 316L stainless steel strip precoated with an electrografted poly-BuMA film and by comparing the erosion of this film, after the strip was held for several days in 9 g/l aqueous sodium chloride solution at 37° C., with respect to that of a POE film deposited on a stainless steel strip not pretreated with an electrografted poly-BuMA film.

To do this, an approximately 300 nm thick poly-BuMA film was electrografted onto a 316L stainless steel strip 10 cm in length and 1 cm in width using the same protocol as that described in Example 2.

Moreover, a $POE_{95}LA_5$ ($M_w$: 60 000; $M_n$: 38 000; $T_g$: −14° C.), which is a solid POE, was prepared as described by M. B. Sintzel et al. (*Biomaterials*, 19, 791, 1998) [15].

Next, a 5% (w/w) POE solution in tetrahydrofuran (THF) was prepared, THF being in fact a solvent for the POE and a swelling agent for the poly-BuMA. A POE film approximately 500 nm in thickness was deposited, by immersing it in this solution, on the stainless steel strip coated with the electrografted poly-BuMA film and on stainless steel strip not pretreated with an electrografted poly-BuMA film.

The strips were dried in an oven at 40° C. for 6 h. They were then left to incubate according to the same protocol as that described in Example 5.

Periodically, the strips were removed, drained and dried in a stream of argon, and the erosion of the POE films coating these strips was assessed by monitoring the change in the transmittance of the 1745 $cm^{-1}$ band corresponding to the carbonyl groups of the POE, as measured by IRRAS spectroscopy as a function of time.

Figure 5:
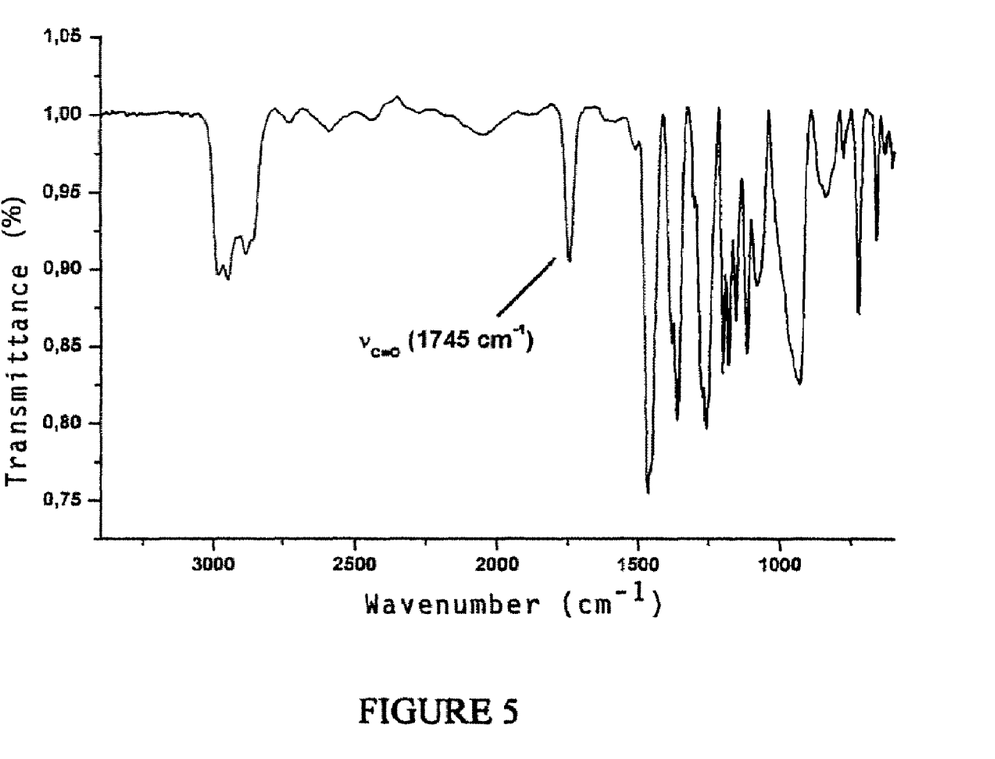
FIG. 5 shows the spectrum, obtained using infrared reflection absorption spectroscopy (IRRAS), of a polyorthoester (POE) film deposited on a stainless steel strip and having a thickness of 500 nm.

FIG. 5, which shows the IRRAS spectrum of a POE film 500 nm in thickness (i.e. the initial thickness of the POE films used in the present example) deposited on a stainless steel strip, shows the POE carbonyl group band located at a wavenumber of 1745 $cm^{-1}$ and used for monitoring the erosion of the POE films.

Figure 6:
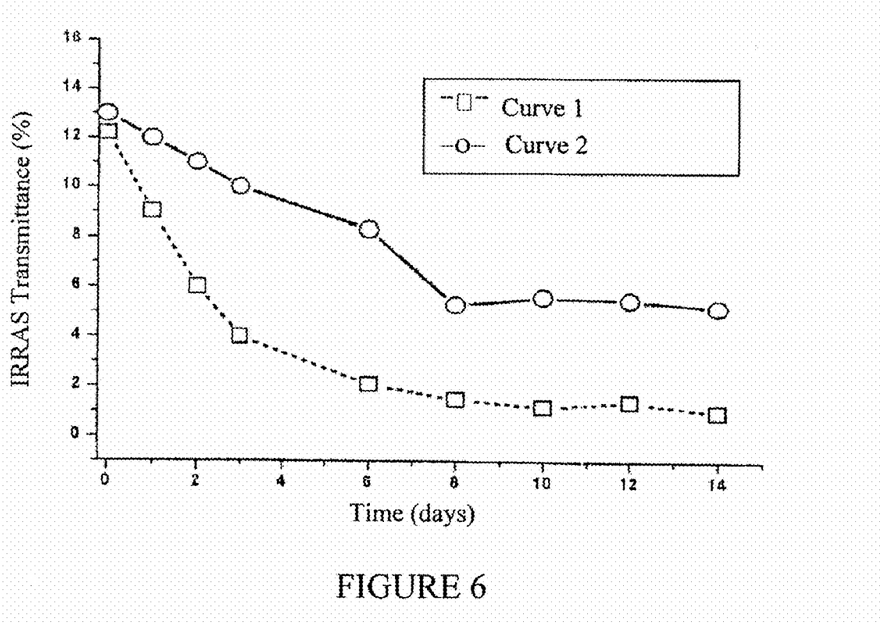
FIG. 6 shows the erosion profiles of a POE film bonded by bonding according to the invention to a stainless steel strip (curve 2) and of a POE film deposited on a stainless steel strip (curve 1).

FIG. 6, in which the transmittance (in percent) of the carbonyl group band is plotted on the Y-axis and time (in days) is plotted on the X-axis, represents the erosion profile of the POE film bonded to the stainless steel strip pretreated with an electrografted poly-BuMA film (Curve 2) and that of the POE film deposited on the unpretreated stainless steel strip (Curve 1).

This figure shows that the POE film deposited on the untreated stainless steel strip is released very rapidly from the surface of this strip. This is in agreement with inspection of the strip, which showed that this film had been delaminated.

In contrast, no deterioration of the POE film bonded by cold bonding to the strip pretreated with an electrografted poly-BuMA film was observed. Progressive disappearance by hydrolysis in contact with the aqueous solution was simply observed.

These results confirm, should it be necessary, those obtained above in Example 5.

CITED DOCUMENTS

[1] EP-A-1 110 946
[2] WO-A-oo/51732
[3] FR-A-2 781 232
[4] E. P. Plueddmann in "Fundamentals of Adhesion", L. H. Lee (Editor), page 269, Plenum Press, New York 1990
[5] U.S. Pat. No. 6,022,597
[6] U.S. Pat. No. 6,287,687
[7] U.S. Pat. No. 4,421,569
[8] U.S. Pat. No. 6,306,975
[9] WO-A-98/49206
[10] WO-A-99/16907
[11] EP-A-0 701 802
[12] WO-A-98/32474
[13] U.S. Pat. No. 6,335,571
[14] FR-A-2 780 200
[15] M. B. Sintzel et al. *Biomaterials*, 19, 791, 1998

The invention claimed is:

1. A method of bonding a first object having a polymer surface together with a second object having an electrically conductive or semiconductive surface, the method comprising the steps of:
   a) electrografting a polymer film onto the conductive or semiconductive surface of the second object; and then
   b) bonding the polymer surface of the first object to the polymer film electrografted onto the conductive or semiconductive surface of the second object;
   wherein the electrografting of the polymer film is an electroinitiated grafting, and
   wherein which the polymer film is obtained from compounds selected from the group consisting of monomers and prepolymers that are partly or completely functionalized by cyclic groups that can be cleaved by nucleophilic or electrophilic attack.

2. The method as claimed in claim 1, wherein the bonding includes a cold bonding.

3. The method as claimed in claim 2, wherein the cold bonding is carried out by means of a substance capable of dissolving or swelling the polymer surface to be bonded and the polymer film electrografted onto the conductive or semiconductive surface.

4. The method as claimed in claim 1, wherein the polymer constituting the polymer surface is selected from the group consisting of polyethylenes, polypropylenes, polystyrenes, polyacrylonitriles, polysiloxanes, polyesters, polyorthoesters, polycaprolactones, polybutyrolactones, polyacrylics, polymethacrylics, polyacrylamides, epoxide resins, copolymers thereof and blends thereof.

5. The method as claimed in claim 1, wherein the polymer constituting the polymer surface includes a hotmelt polymer.

6. The method as claimed in claim 1, wherein the polymer surface includes a polymer film coating a conductive or semiconductive material.

7. The method as claimed in claim 1, wherein the polymer film has a thickness of between 50 and 300 nm.

8. The method as claimed in claim 1, wherein the bonding includes a hotmelt bonding.

9. The method as claimed in claim 1, wherein the bonding includes a combination of a hotmelt bonding and a cold bonding.

10. A method for bonding a first object having a polymer surface together with a second object having an electrically conductive or semiconductive surface, the method comprising the steps of:
   a) electrografting an organic film onto the conductive or semiconductive surface of the second object; and then
   b) bonding the polymer surface of the first object to the polymer film electrografted onto the conductive or semiconductive surface of the second object thus grafted,
   wherein the bonding includes a cold bonding or a combination of the cold bonding and a hotmelt bonding, and
   wherein the cold bonding is carried out by means of a substance capable of dissolving or swelling the polymer surface to be bonded and the organic film electrografted onto the conductive or semiconductive surface.

11. The method as claimed in claim 10, wherein the electrografting of the organic film includes an electroinitiated grafting.

12. The method as claimed in claim 11, wherein the organic film includes a polymer film.

13. The method as claimed in claim 12, wherein the polymer film is obtained from compounds selected from the group consisting of monomers and prepolymers that are partly or completely functionalized by vinyl groups.

14. The method as claimed in claim 13, wherein the polymer film is obtained from a vinyl monomer selected from the group consisting of acrylonitrile, methacrylonitrile, acrylates and methacrylates, acrylamides, methacrylamides, cyanoacrylates, acrylic acid, methacrylic acid, styrene, vinyl halides, N vinylpyrrolidone, 2 vinylpyridine, 4 vinylpyridine and vinyl-terminated telechelic compounds.

15. The method as claimed in claim 12, wherein the polymer film is obtained from compounds selected from the group consisting of monomers and prepolymers that are partly or completely functionalized by cyclic groups that can be cleaved by nucleophilic or electrophilic attack.

16. The method as claimed in claim 11, wherein the organic film is obtained from diazonium, sulfonium, phosphonium or iodonium salts, or mixtures thereof.

17. The method as claimed in claim 10, wherein the polymer constituting the polymer surface is selected from the group consisting of polyethylenes, polypropylenes, polystyrenes, polyacrylonitriles, polysiloxanes, polyesters, polyorthoesters, polycaprolactones, polybutyrolactones, polyacrylics, polymethacrylics, polyacrylamides, epoxide resins, copolymers thereof and blends thereof.

18. The method as claimed in claim 10, wherein the polymer constituting the polymer surface includes a hotmelt polymer.

19. The method as claimed in claim 10, wherein the polymer surface includes a polymer film coating a conductive or semiconductive material.

20. The method as claimed in claim 10, wherein the organic film has a thickness of between 50 and 300 nm.

* * * * *